United States Patent
Kaneko

(10) Patent No.: US 9,207,895 B2
(45) Date of Patent: Dec. 8, 2015

(54) IMAGE FORMING APPARATUS THAT STORES DATA OF PRINT JOB IN MEMORY AREA, METHOD OF CONTROLLING IMAGE FORMING APPARATUS, AND STORAGE MEDIUM

(71) Applicant: CANON KABUSHIKI KAISHA, Tokyo (JP)

(72) Inventor: Takayuki Kaneko, Machida (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/462,688

(22) Filed: Aug. 19, 2014

(65) Prior Publication Data

US 2015/0055183 A1 Feb. 26, 2015

(30) Foreign Application Priority Data

Aug. 22, 2013 (JP) ................. 2013-172255

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC ............ *G06F 3/1267* (2013.01); *G06F 3/1211* (2013.01); *G06F 3/1285* (2013.01)

(58) Field of Classification Search
CPC .... G06F 3/1267; G06F 3/1285; G06F 3/1211
USPC ................. 358/1.16, 1.14, 1.15, 1.1
See application file for complete search history.

(56) References Cited

U.S. PATENT DOCUMENTS

| | | | | |
|---|---|---|---|---|
| 7,505,166 | B2* | 3/2009 | Han | 358/1.16 |
| 8,085,425 | B2* | 12/2011 | Abe | 358/1.16 |
| 8,115,951 | B2 | 2/2012 | Nuggehalli | |

FOREIGN PATENT DOCUMENTS

| | | |
|---|---|---|
| JP | 06105098 A | 4/1994 |
| JP | 2008265341 A | 11/2008 |

* cited by examiner

*Primary Examiner* — Douglas Tran
(74) *Attorney, Agent, or Firm* — Rossi, Kimms & McDowell LLP

(57) ABSTRACT

A image forming apparatus capable of performing reservation printing, even when incapable of storing print data in a memory unit due to an insufficient free space, by securing a memory area which is not used by other users. Print data is input from a PC to an MFP so as to be reserved in a memory area of an auxiliary memory of the MFP, and is printed out by the MFP in response to an instruction from a user who has logged in the MFP. The auxiliary memory has a reservation printing area and a reservation printing emergency area for storing print data. If print data of the logged-in user cannot be stored in the reservation printing area due to an insufficient free space, the print data is stored in the reservation printing emergency area in response to an instruction from the logged-in user.

11 Claims, 15 Drawing Sheets

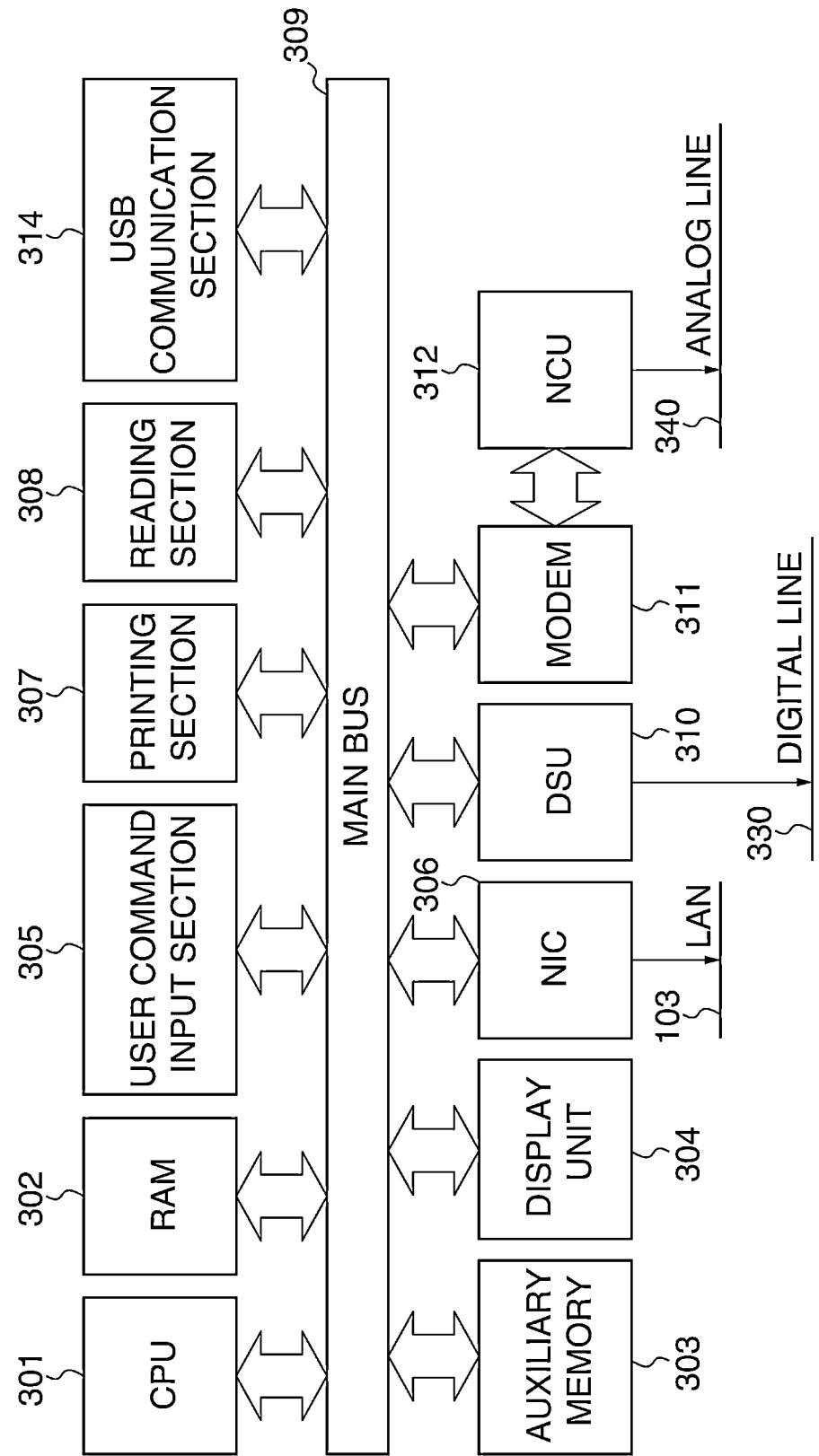

*FIG. 15*

| JOB HISTORY 801 | | |
|---|---|---|
| JOB NAME | USER NAME 802 | RESULT 803 |
| MINUTES OF MEETING | kaneko | OK |
| HOW TO MAKE DELICIOUS CURRY | nakajima | OK |
| ABOUT TIME MACHINE | maeda | OK |
| DOCUMENT OF UNION | yokokura | OK |
| EXAMINATION OF IMPROVEMENT OF WAY OF WORKING | matoba | OK |
| ABC PROJECT PROPOSAL | toyokura | OK |
| INVITATION TO GOLF COMPETITION | konishi | OK |
| NOTIFICATION OF HOLIDAY WORK | fukasawa | OK |
| ABSTRACT OF SPECIFICATION | kaneko | NG : INSUFFICIENT FREE SPACE 805 |
| DISCOUNT COUPON | mizuno | NG : INSUFFICIENT FREE SPACE |
| WRITTEN APOLOGY | kirihata | NG : INSUFFICIENT FREE SPACE |

800

EMERGENCY AREA RESERVATION 804

◄ 806
► 807

EMERGENCY AREA-RESERVING USER MANAGEMENT INFORMATION TABLE ~1700

| EMERGENCY AREA-RESERVING USER | kaneko | ~1701 |
|---|---|---|
| RESERVATION EXPIRATION TIME | 2012/6/29 13:00 | ~1702 |

IMAGE FORMING APPARATUS THAT STORES DATA OF PRINT JOB IN MEMORY AREA, METHOD OF CONTROLLING IMAGE FORMING APPARATUS, AND STORAGE MEDIUM

BACKGROUND OF THE INVENTION

1. Field of the Invention

The present invention relates to an image forming apparatus that stores a print job in a memory area, a method of controlling the image forming apparatus, and a storage medium, and more particularly to a job control technique for an image forming apparatus, which makes it possible perform reservation printing even in a state of a memory area in which a free space thereof for storing data of a print job is insufficient.

2. Description of the Related Art

In recent years, an image forming apparatus has come to be used which is equipped with an auxiliary memory, such as a hard disk, and has a function of reservation printing in which data of a print job is stored in the auxiliary memory, and the print job is printed out based on the stored data thereof at a desired time. In this image forming apparatus, unless access control is carried out for the data of the print job stored in the auxiliary memory, any user can print out the data of this print job, and hence it is undesirable from the viewpoint of security. To solve this problem, there has been proposed an authentication-linked reservation printing system in which reservation printing is performed by associating a user of an image forming apparatus and an owner of stored data with each other (see e.g. Japanese Patent Laid-Open Publication No. 2008-265341).

On the other hand, in a case where the image forming apparatus is operated in a forcible reservation mode in which the aforementioned reservation printing is forcibly executed, if the free space of the auxiliary memory becomes insufficient, not only printing but also storage of data of a print job for reservation itself cannot be executed, and hence it is undesirable from the viewpoint of user-friendliness. To solve this problem, there has been proposed an image forming apparatus capable of increasing the free space of the auxiliary memory by compressing old data stored therein (see e.g. Japanese Patent Laid-Open Publication No. H06-105098).

A combination of the methods disclosed in Japanese Patent Laid-Open Publication No. 2008-265341 and Japanese Patent Laid-Open Publication No. H06-105098 makes it possible to construct a reservation printing system in which a print job stored in an auxiliary memory is associated with an owner of the job, and the free space of the auxiliary memory can be increased by compressing old data stored therein when the free space becomes insufficient.

However, according to this reservation printing system, it is impossible to increase the free space when all data items stored in the auxiliary memory have already been compressed. Further, even if the free space can be increased in the above-described manner, there can occur a case where data of a print job of another user is stored in the increased free space area, and this sometimes makes it impossible to store the data of the user's own print job. Particularly, in an environment in which the image forming apparatus is operated in the above-mentioned forcible reservation mode, if the free space of the auxiliary memory is exhausted, the image forming apparatus becomes incapable of executing either reservation of a print job or printing thereof.

SUMMARY OF THE INVENTION

The present invention provides an image forming apparatus that is capable of performing reservation printing, even when it becomes incapable of storing data of a print job (print data) in a memory unit due to an insufficient free space of a memory area thereof, by securing a memory area for storing the print data, which is prevented from being used by other users.

In a first aspect of the present invention, there is provided an image forming apparatus comprising a memory unit having a first memory area and a second memory area, a reception unit configured to receive an instruction for storing data of a print job in the second memory area in a case where the data of the print job cannot be stored in the first memory area due to an insufficient free space of the first memory area, and a control unit configured to cause the data to be stored in the second memory area.

In a second aspect of the present invention, there is provided a method of controlling an image forming apparatus, comprising storing data of a print job in a memory unit having a first memory area and a second memory area, receiving an instruction for storing the data of the print job in the second memory area in a case where the data of the print job cannot be stored in the first memory area due to an insufficient free space of the first memory area, and causing the data to be stored in the second memory area.

In a third aspect of the present invention, there is provided a non-transitory computer-readable storage medium storing a computer-executable program for executing a method of controlling an image forming apparatus, wherein the method comprises storing data of a print job in a memory unit having a first memory area and a second memory area, receiving an instruction for storing the data of the print job in the second memory area in a case where the data of the print job cannot be stored in the first memory area due to an insufficient free space of the first memory area, and causing the data to be stored in the second memory area.

According to the present invention, in a case where print data cannot be stored in the memory unit due to an insufficient free space of the first memory area for storing print data, the second memory area, which is different from the first memory area, is reserved in the memory unit such that only print data of a specified user can be stored therein for a specified time period. This enables the image forming apparatus to perform reservation printing, even when it becomes incapable of storing print data in the memory unit due to an insufficient free memory area, by securing a memory area which is prevented from being used by other users.

Further features of the present invention will become apparent from the following description of exemplary embodiments (with reference to the attached drawings).

BRIEF DESCRIPTION OF THE DRAWINGS

FIG. 3 is a block diagram of the hardware of the MFP appearing in FIG. 1.

FIG. 15 is a diagram showing an example of a job history screen displayed on the display unit of the MFP.

DESCRIPTION OF THE EMBODIMENTS

The present invention will now be described in detail below with reference to the accompanying drawings showing embodiments thereof.

Figure 1:
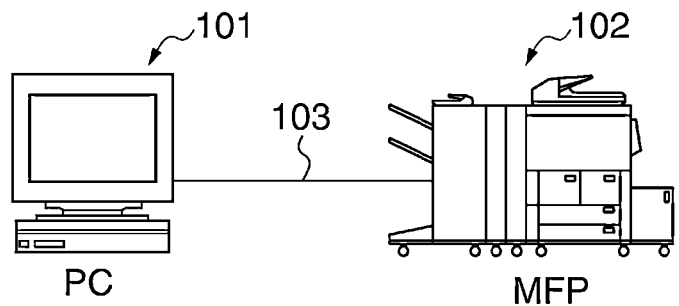
FIG. 1 is a schematic diagram of a reservation printing system including an MFP as an image forming apparatus according to an embodiment of the present invention.

FIG. 1 is a schematic diagram of a reservation printing system including an MFP (multifunction peripheral) as an image forming apparatus according to an embodiment of the present invention.

Referring to FIG. 1, reference numeral 101 denotes a personal computer as an information processing apparatus (hereinafter referred to as the "PC") capable of connecting to a LAN (local area network) 103, and reference numeral 102 denotes the image forming apparatus (hereinafter referred to as the "MFP") capable of performing printing based on data of a print job (print data) received from the PC 101.

Although in the present embodiment, the PC 101 and the MFP 102 are connected via the LAN 103, the PC 101 and the MFP 102 may be connected by a parallel cable, a serial cable, a USB (Universal Serial Bus) cable, or the like.

In the illustrated reservation printing system, a print job is input from the PC 101 to the MFP 102, whereby the print job is reserved in a memory area of an auxiliary memory of the MFP 102, and a printing process is executed by the MFP 102 in response to an instruction from an authenticated user.

Figure 2:
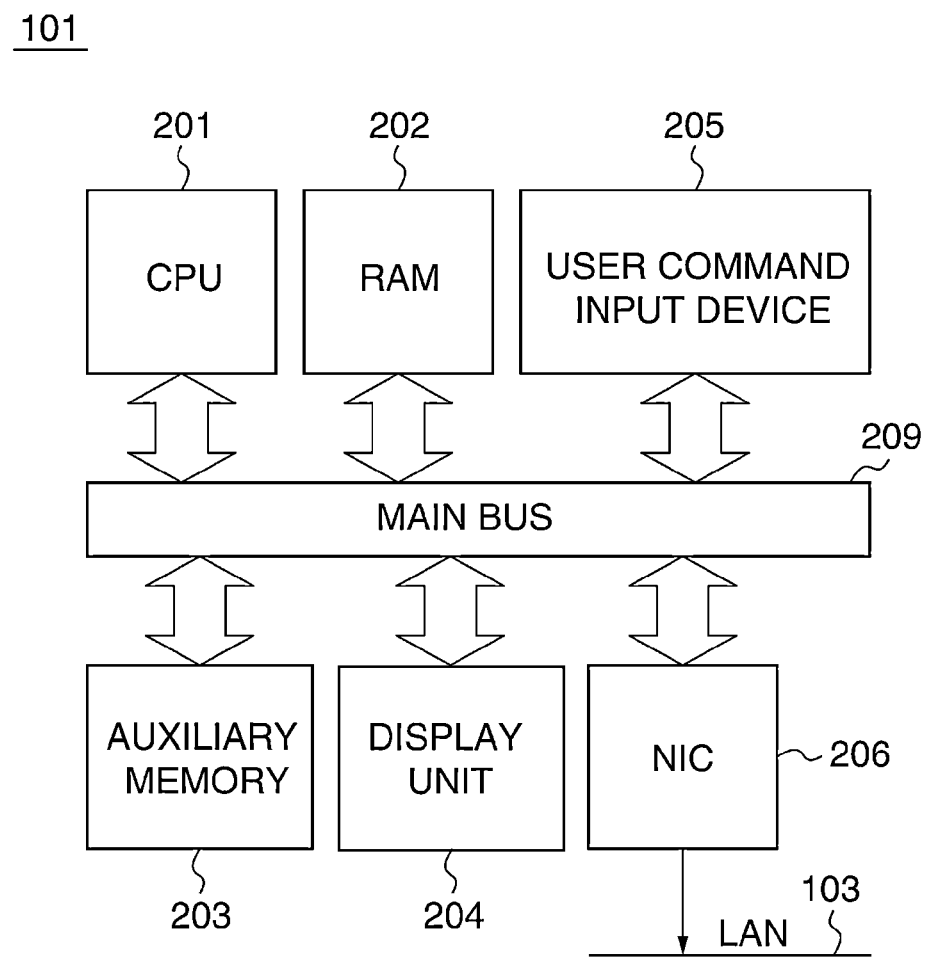
FIG. 2 is a block diagram of the hardware of a PC appearing in FIG. 1.

FIG. 2 is a block diagram of the hardware of the PC 101 appearing in FIG. 1.

Referring to FIG. 2, reference numeral 201 denotes a CPU (central processing unit) that controls the overall operation of the PC 101. Reference numeral 202 denotes a RAM (random access memory) that provides a work area for the CPU 201. Reference numeral 203 denotes an auxiliary memory that stores control programs of the present embodiment. The auxiliary memory 203 is formed by a hard disk and the like.

Reference numeral 204 denotes a display unit that displays information including messages. The display unit 204 is formed by a CRT display, a liquid crystal display, or the like.

Reference numeral 205 denotes a user command input device that receives an input of a command or the like from the user. The user command input device 205 is comprised of a mouse, a keyboard, and the like.

Reference numeral 206 denotes a network interface card (NIC) for bi-directionally exchanging data between the PC 101 and other network devices via the LAN 103. Reference numeral 209 denotes a main bus.

FIG. 3 is a block diagram of the hardware of the MFP 102 appearing in FIG. 1.

Referring to FIG. 3, reference numeral 301 denotes a CPU that controls the overall operation of the MFP 102. Reference numeral 302 denotes a RAM that provides a work area for the CPU 301, and is also used for temporarily storing data. Reference numeral 303 denotes an auxiliary memory that temporarily stores data and is sometimes used in place of the RAM 302. The auxiliary memory 303 is formed by a hard disk and the like.

Reference numeral 304 denotes a display unit, such as a touch panel, that displays a state of the MFP 102, information including an error message, etc. Reference numeral 305 denotes a user command input section that receives operations and instructions from the user. The user command input section 305 is comprised e.g. of a touch panel.

Reference numeral 306 denotes a NIC for bi-directionally exchanging data between the MFP 102 and other devices via the LAN 103. Reference numeral 307 denotes a printing section (printing engine) for printing image data or the like scanned by a reading section 308, on a sheet. The printing section 307 is capable of recognizing a state of a sheet feeding optional unit (e.g. a sheet feed cassette) and a sheet discharging optional unit (e.g. a finisher apparatus).

The reading section 308 is a scanner that reads an original paper document placed on an original platen glass, not shown, and generates monochrome binary image data and color multilevel image data. The read image data can be printed by the printing section 307, and also can be reserved in the auxiliary memory 303 and printed at a desired time.

Reference numeral 310 denotes a DSU (Digital Service Unit: digital line terminating device) that is connected to a digital line 330, and is used for transmitting and receiving data. Reference numeral 312 denotes an NCU (Network Control Unit) that is connected to an analog line 340, and is used for opening and closing the line, performing transmission and reception control, and transmitting and receiving image data (analog). Reference numeral 311 denotes a modem that modulates data to be transmitted and demodulates received data. Reference numeral 314 denotes a USB communication section that transmits and receives data to and from an external information terminal by USB. Reference numeral 309 denotes a main bus.

Figure 4A:
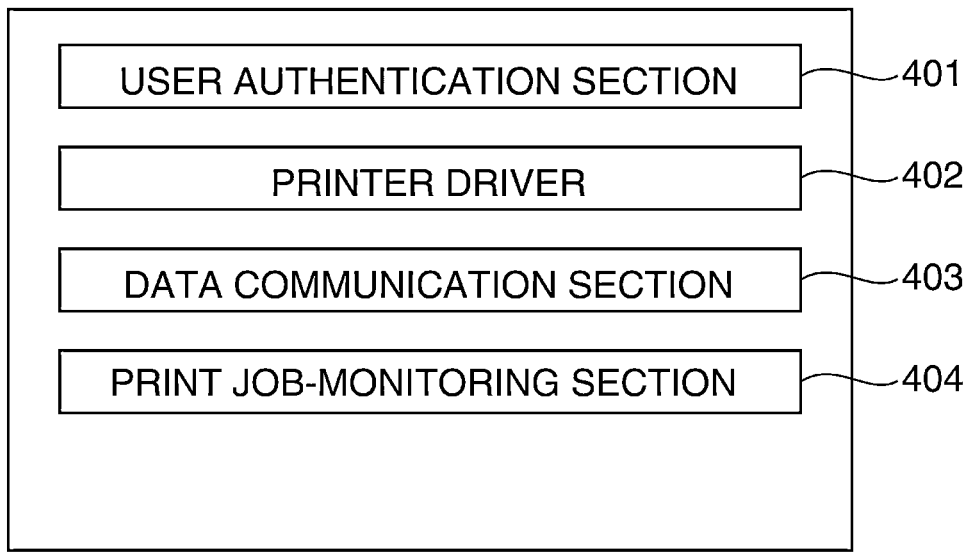
FIG. 4A is a block diagram of the software for print control by the PC.

FIG. 4A is a block diagram of the software for print control by the PC 101. Note that reference numerals 401 to 404 in FIG. 4A denote software modules stored in the auxiliary memory 203 of the PC 101, and the function of each module is realized by the CPU 201 which loads the module into the RAM 202 and executes the loaded module.

Referring to FIG. 4A, reference numeral 401 denotes a user authentication section for authenticating a user who is about to use the PC 101. User authentication information can be input from the user command input device 205, but may be input via an authentication system that uses e.g. an IC card reader. Reference numeral 402 denotes a printer driver used for generating a print job in response to an instruction from a desired application, such as a text editor, and inputting the generated print job to the MFP 102.

Reference numeral 403 denotes a data communication section used for inputting the print job generated by the printer driver 402 to the MFP 102, and receiving a processing result of the input print job from the MFP 102. The data communication section 403 uses the NIC 206 for hardware, but may use an interface, such as a USB interface.

Reference numeral 404 denotes a print job-monitoring section for recognizing a processing result of a print job input to the MFP 102, and displaying the processing result on the display unit 204.

Figure 4B:
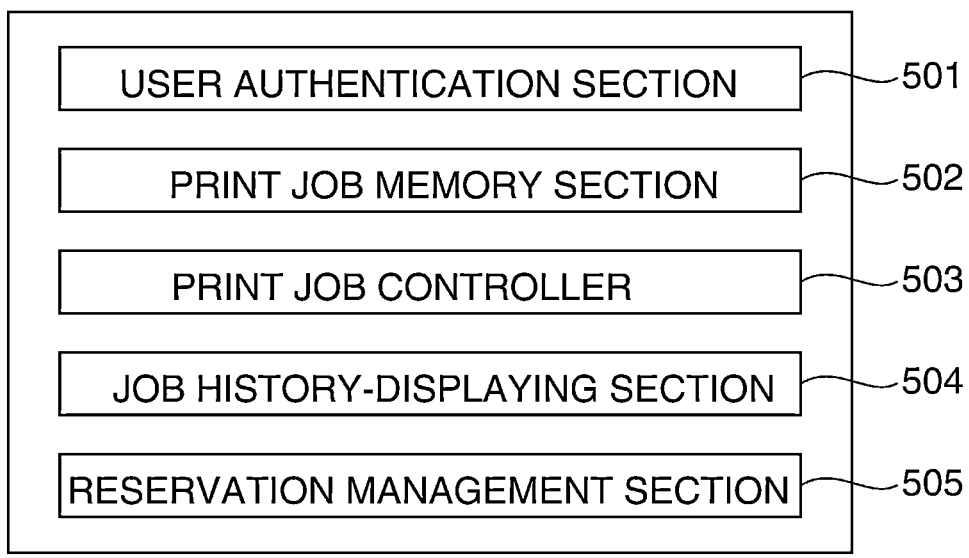
FIG. 4B is a block diagram of the software for print control by the MFP.

FIG. 4B is a block diagram of the software for print control by the MFP 102. Note that reference numerals 501 to 505 in FIG. 4B denote software modules stored in the auxiliary memory 303 of the MFP 102, and the function of each module is realized by the CPU 301 which loads the module into the RAM 302 and executes the loaded module.

Referring to FIG. 4B, reference numeral 501 denotes a user authentication section for authenticating a user who is about to use the MFP 102. User authentication information can be input from the user command input device 305, but may be input via an authentication system using e.g. an IC card reader.

Figures 16A, 16B:
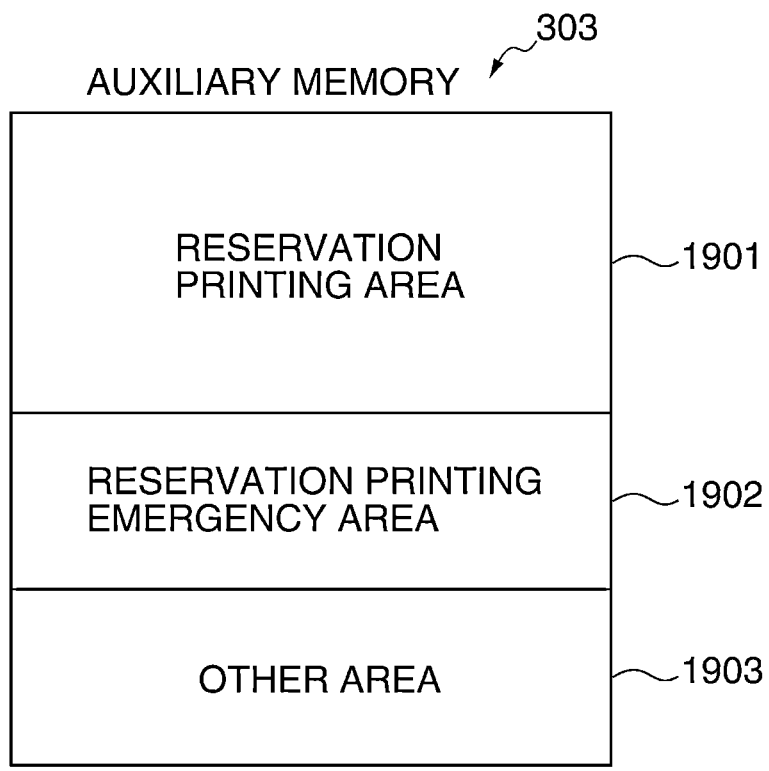
FIG. 16A is a schematic diagram of a memory area of an auxiliary memory of the MFP.
FIG. 16B is a diagram showing an example of an emergency area-reserving user management information table generated in a step S1404 in FIG. 12.

Reference numeral 502 denotes a print job memory section that stores data of a print job input from the PC 101, in a reservation printing area of the auxiliary memory 303, and manages a free space of the reservation printing area. FIG. 16A schematically shows a memory area of the auxiliary memory 303.

Referring to FIG. 16A, the memory area of the auxiliary memory 303 is divided into a reservation printing area 1901 (first memory area), a reservation printing emergency area 1902 (second memory area), and the other area 1903.

The reservation printing area 1901 is a memory area for storing data of print jobs. The reservation printing emergency area 1902 is a memory area which can be used when the free space of the reservation printing area 1901 is insufficient. The other area 1903 is a memory area of the auxiliary memory 303 other than the reservation printing area 1901 and the reservation printing emergency area 1902.

Referring again to FIG. 4B, reference numeral 503 denotes a print job controller that controls receiving of a print job input from the PC 101, and printing of a print job whose data is stored in the auxiliary memory 303. The print job controller 503 receives a print job from the PC 101 via the NIC 306, but may receive a print job via a parallel cable, a serial cable, a USB cable, or the like.

Reference numeral 504 denotes a job history-displaying section that displays the job history of print jobs processed by the print job controller 503.

Reference numeral 505 denotes a reservation management section that manages reservation of the reservation printing emergency area 1902 of the auxiliary memory 303.

Figure 5:
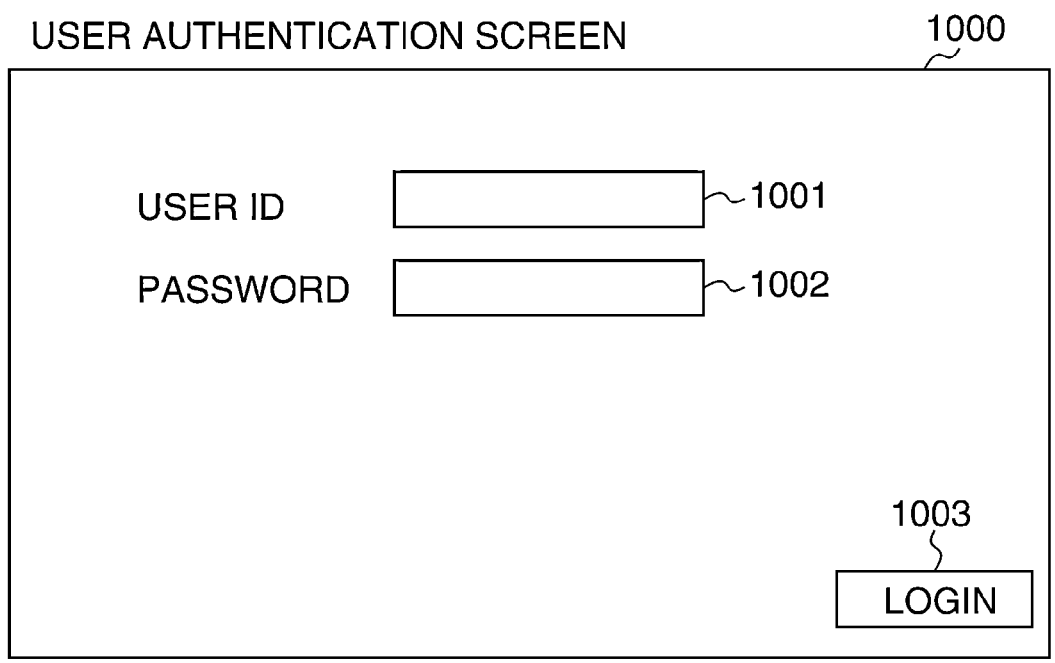
FIG. 5 is a diagram showing an example of a screen for inputting user authentication information, which is displayed on a display unit of the PC and a display unit of the MFP.

FIG. 5 is a diagram showing an example of a screen for inputting user authentication information, which is displayed on the display unit 204 of the PC 101 and the display unit 304 of the MFP 102.

In the PC 101, the user authentication section 401 displays a user authentication screen 1000, shown in FIG. 5, on the display unit 204. On the other hand, also in the MFP 102, the user authentication section 501 displays the illustrated user authentication screen 1000 on the display unit 304.

On the user authentication screen 1000, reference numeral 1001 denotes an area for inputting a user ID, and reference numeral 1002 denotes an area for inputting a password. Reference numeral 1003 denotes a login button. When the user presses the login button 1003 on the user authentication screen 1000 of the PC 101 or the MFP 102, if the input user ID and password are correct, the user is permitted to use the PC 101 or the MFP 102. The user authentication method employs a known technique, and hence detailed description thereof is omitted.

Figure 6:
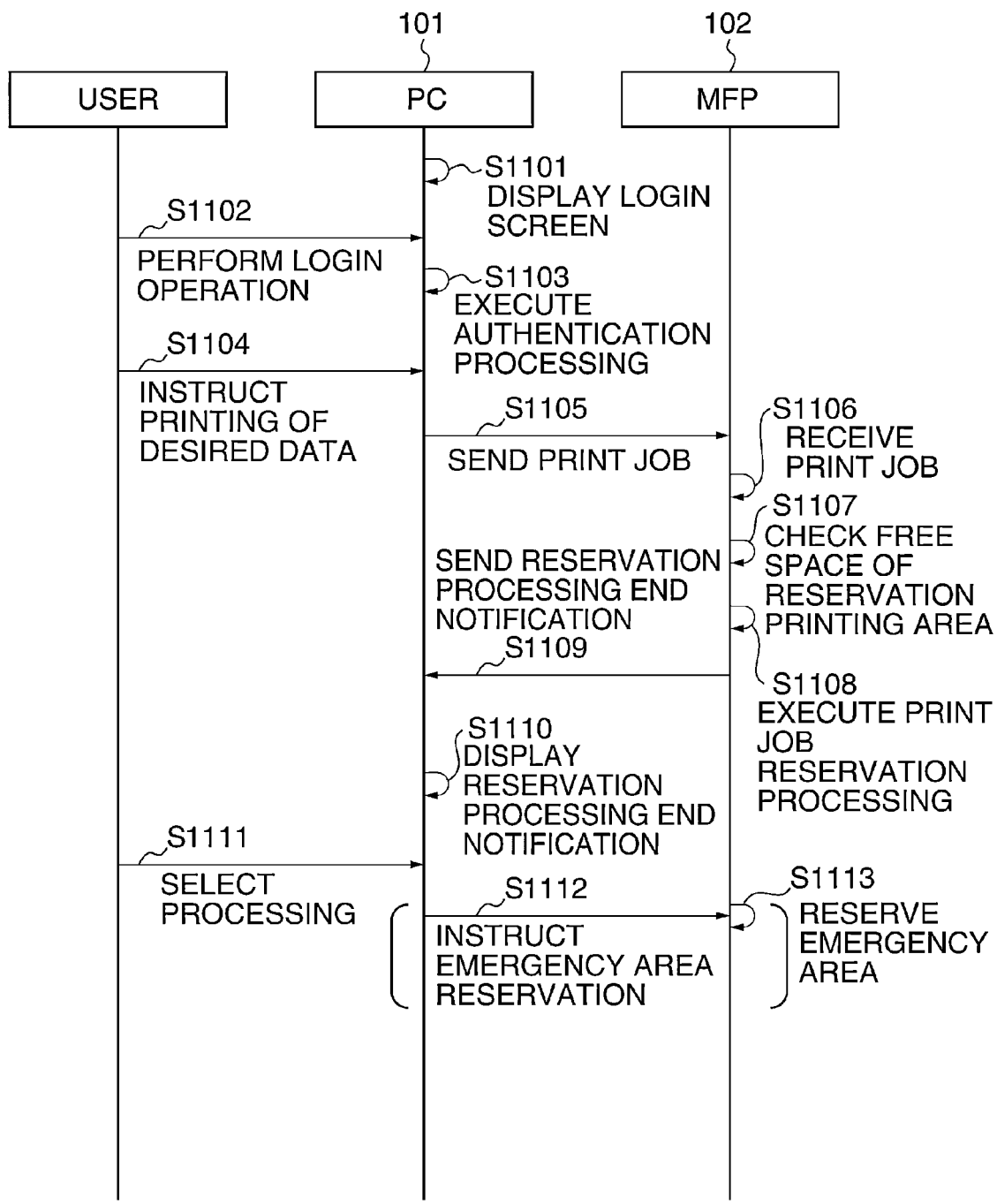
FIG. 6 is a sequence diagram showing a sequence of operations performed between a user, the PC, and the MFP of the reservation printing system shown in FIG. 1, when a print job is processed according to a print instruction by the user.

FIG. 6 is a sequence diagram showing a sequence of operations performed between a user, the PC 101, and the MFP 102 of the reservation printing system shown in FIG. 1, when a print job is processed according to a print instruction by the user. Note that the MFP 102 is assumed to be set to a forcible reservation mode, referred to hereinafter.

In the PC 101, the user authentication screen 1000 (login screen) is displayed on the display unit 204 (step S1101). A user inputs a user ID and a password on the user authentication screen 1000, and then presses the login button 1003 (step S1102). This causes the user authentication section 401 of the PC 101 to perform authentication processing (step S1103).

When the user provides an instruction to the PC 101, for printing desired data from an desired application, such as a text editor (step S1104), the printer driver 402 and the data communication section 403 operate to send a print job to the MFP 102 (step S1105).

In the MFP 102, when the print job controller 503 receives the print job from the PC 101 (step S1106), the print job memory section 502 checks whether or not there is a free space sufficient to store data of the received print job in the reservation printing area 1901 (step S1107). Then, print job reservation processing is executed, depending on the result of check in the step S1107, to store the data of the received print job or not to store the same (step S1108), and a processing result is notified to the PC 101 as a reservation processing end notification (step S1109). In the step S1109, the print job controller 503 functions as a result display unit.

Figure 7A:
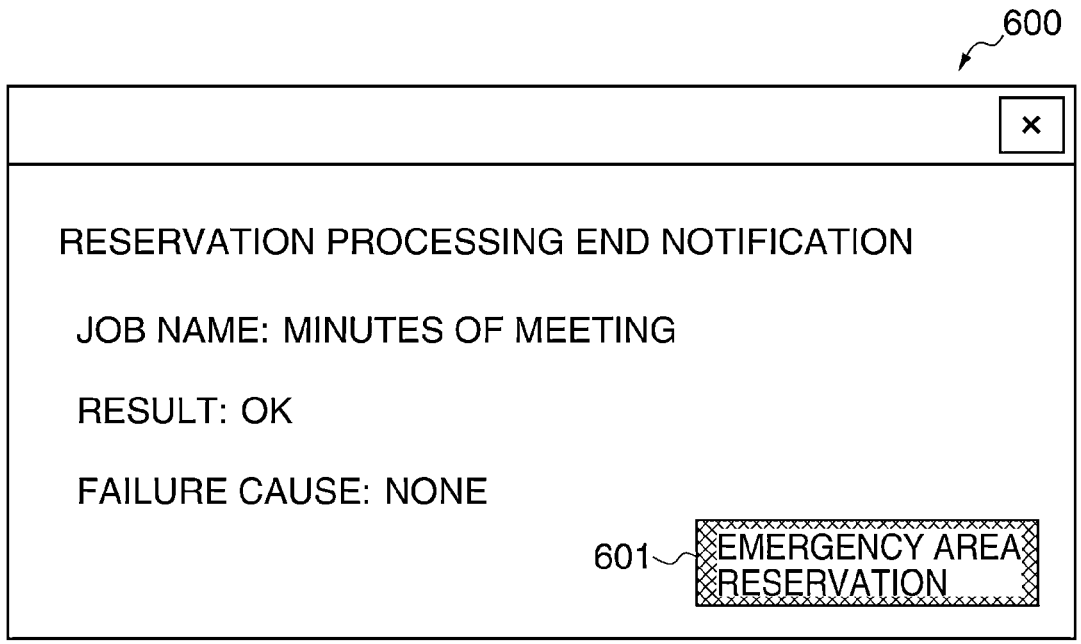
FIG. 7A is a diagram showing an example of a job reservation processing result screen displayed on the display unit of the PC in a case where print job reservation processing has been successfully executed.
Figure 7B:
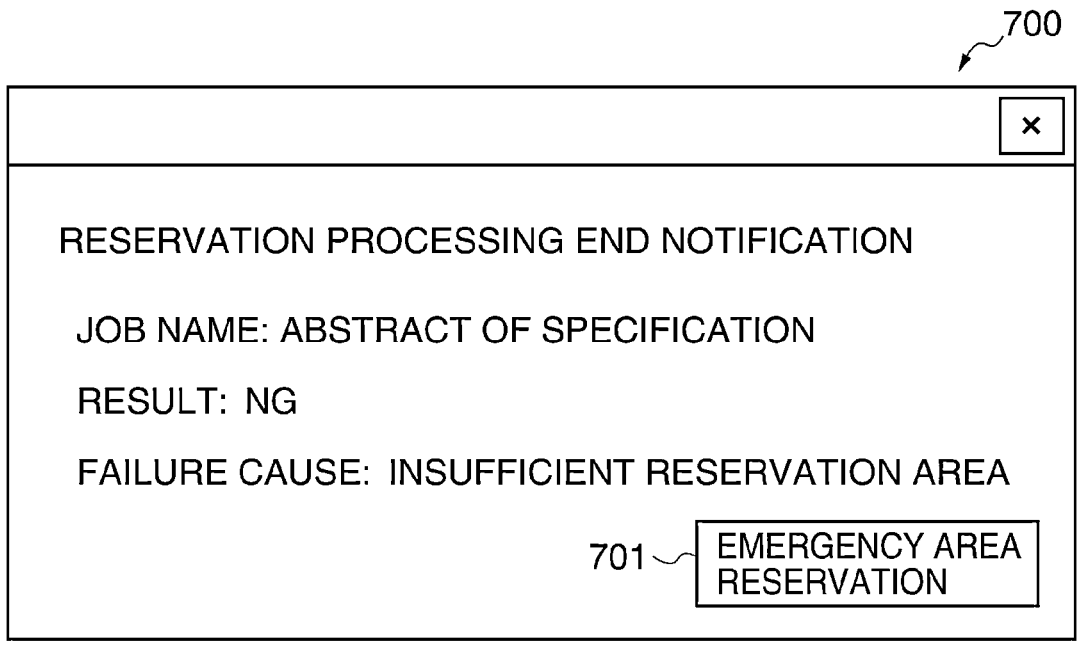
FIG. 7B is a diagram showing an example of the job reservation processing result screen displayed on the display unit of the PC in a case where the print job reservation processing has not been successfully executed.

In the PC 101, the reservation processing end notification received from the MFP 102 is displayed on the display unit 204 (step S1110). FIGS. 7A and 7B show examples of the screen displayed in the step S1110.

A job reservation processing result screen 600 shown in FIG. 7A is a screen of the reservation processing end notification displayed, in a case where the print job reservation processing has been successfully executed in the steps S1107 and S1108 in FIG. 6 and hence data of the print job could be stored in the reservation printing area 1901 of the auxiliary memory 303. In the present embodiment, in the case where data of a print job could be stored by the print job reservation processing, an emergency area reservation button, denoted by reference numeral 601, is grayed out to prevent pressing thereof.

A job reservation processing result screen 700 shown in FIG. 7B is a screen of the reservation processing end notification displayed in a case where the print job reservation processing has not been successfully executed in the steps S1107 and S1108 in FIG. 6 and hence the data of the print job could not be stored in the reservation printing area 1901 of the auxiliary memory 303. In the present embodiment, in the case where the data of the print job could not be stored, the emergency area reservation button, denoted by reference numeral 701, is normally displayed to enable pressing thereof.

Referring again to FIG. 6, the user selects processing by closing the job reservation processing result screen 600 or 700 displayed on the display unit 204 of the PC 101 or pressing the emergency area reservation button (step S1111).

For example, when the emergency area reservation button 701 on the job reservation processing result screen 700 is pressed, an instruction for reserving the reservation printing emergency area 1902 is sent together with the user ID from the PC 101 to the MFP 102 (step S1112).

In the MFP 102, the reservation management section 505 reserves the reservation printing emergency area 1902 according to the user ID and the instruction for reserving the reservation printing emergency area 1902, received from the PC 101 (step S1113).

Next, a method of setting reservation printing performed in the reservation printing system will be described with reference to FIG. 8.

Figure 8:
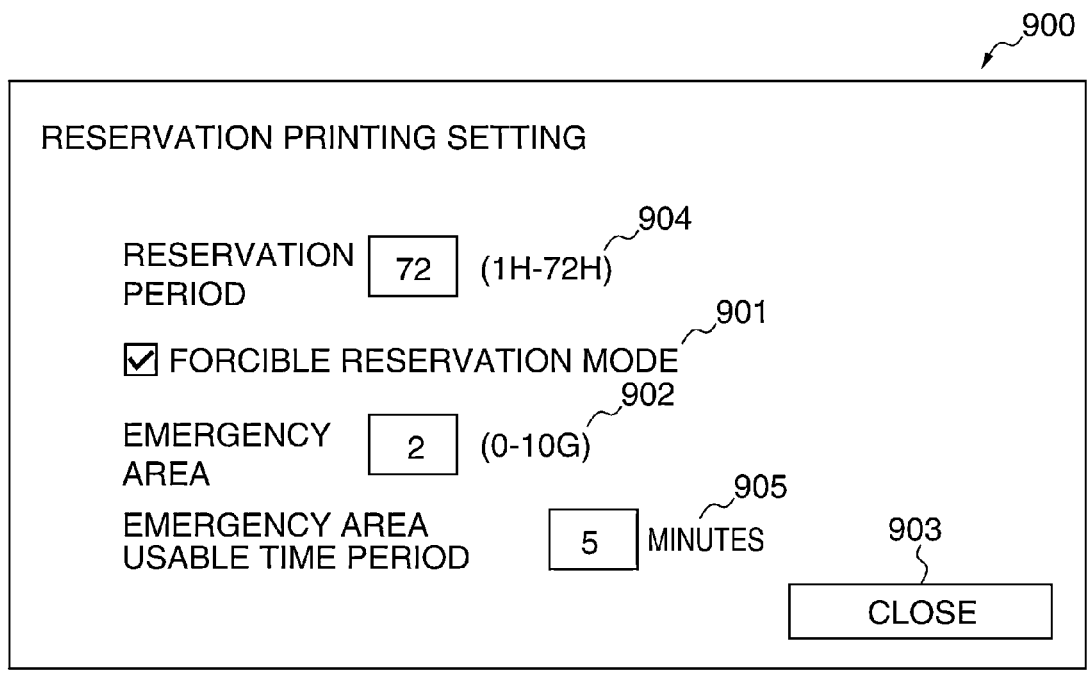
FIG. 8 is a diagram showing an example of a reservation printing setting screen displayed on the display unit of the MFP.

FIG. 8 is a diagram showing an example of a reservation printing setting screen displayed on the display unit 304 of the MFP 102. The illustrated screen is displayed by the print job controller 503.

On the reservation printing setting screen, denoted by reference numeral 900, reference numeral 901 denotes an on/off switch of the forcible reservation mode (hereinafter, the forcible reservation mode itself is denoted by 901). If a check box for the forcible reservation mode 901 is checked, the forcible reservation mode 901 is set to on, whereas if not, the forcible reservation mode 901 is set to off. When the forcible reservation mode 901 is set to on, a normal printing process based on print data of a received print job is not executed, but the print job memory section 502 stores data of the received print job in the reservation printing area 1901.

On the other hand, if the forcible reservation mode 901 is set to off, the print job controller 503 controls the printing section 307 to print out the print job received in the step S1106 in FIG. 6. The print job controller 503 may determine execution of reservation printing according to a condition other than on/off of the forcible reservation mode. For example, the printer driver 402 may provide a changeover switch for switching between the normal printing process and the reservation printing process, and the print job controller 502 may be configured to operate according to a state of the changeover switch. Alternatively, the operation mode may be changed according to both of the conditions of a state of the changeover switch provided by the printer driver 402 and a setting of the forcible reservation mode 901.

Reference numeral 902 denotes an input section for setting a capacity of the reservation printing emergency area 1902 which is used only when the free space of the reservation printing area 1901 is insufficient (hereinafter, referred to as the emergency area 902). In the present embodiment, the capacity can be specified within a range of 0 to 10 gigabytes. Reference numeral 903 denotes a button for closing the reservation printing setting screen 900 after storing settings input by the user.

Reference numeral 904 denotes an input section for setting a storage period (reservation period) of a print job (hereinafter the reservation period itself is denoted by 904). In the present embodiment, the reservation period 904 can be specified within a range of 1 to 72 hours. Although detailed description is omitted, the present embodiment is configured such that when a time period input as the reservation period 904 elapses after data of a print job has been stored in the reservation printing area 1901 of the auxiliary memory 303, the data of the print job is deleted by the print job memory section 502.

Reference numeral 905 denotes an input section for setting a time period over which the reservation printing emergency area 1902 can be used (emergency area usable time period; hereinafter the emergency area usable time period itself is denoted by 905). The print job controller 503 deletes the data of a print job stored in the reservation printing emergency area 1902 when the time period input as the emergency area usable time period 905 elapses. Note that the time period input as the above-mentioned reservation period 904 is applied to data of a print job stored in the reservation printing area 1901. Next, a print job control process performed when a user logs in the MFP 102 will be described.

Figure 9:
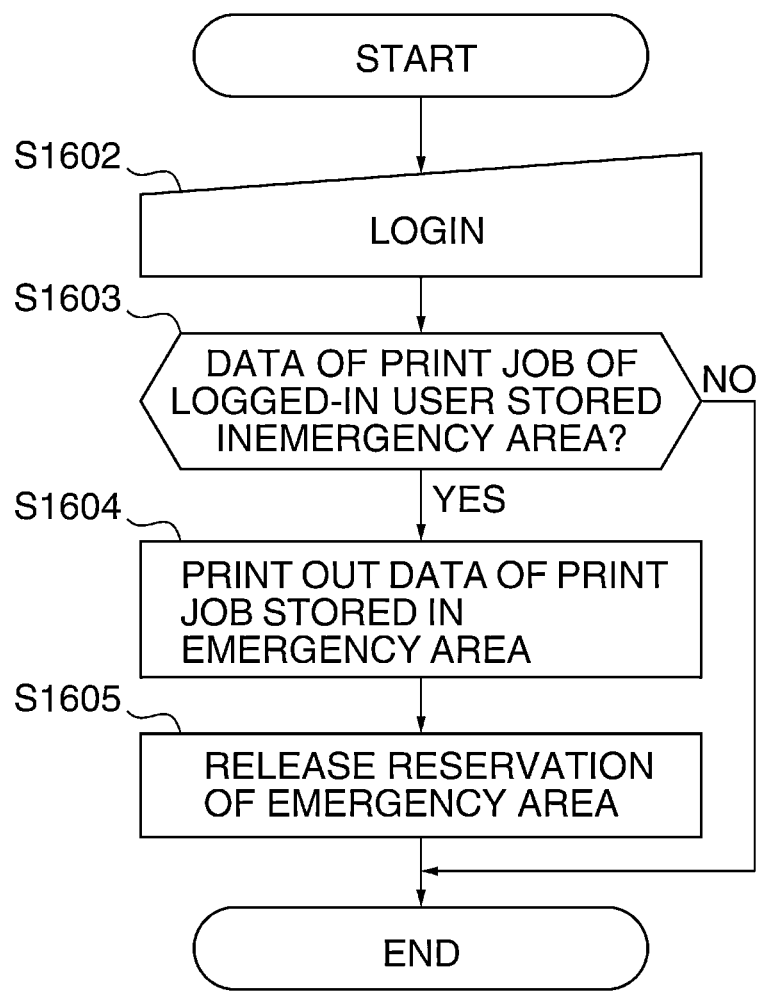
FIG. 9 is a flowchart of a print job control process performed by a print job controller immediately after a user logs in the MFP.

FIG. 9 is a flowchart of the print job control process performed by the print job controller 503 immediately after a user logs in the MFP 102.

Upon detection of login of a user to the MFP 102 (step S1602), the print job controller 503 determines whether or not data of a print job of the logged-in user has been stored in the reservation printing emergency area 1902 (step S1603). In this process, the logged-in user refers to a user who has being successfully authenticated by inputting a user ID and a password on the user authentication screen 1000 and pressing the login button 1003.

If it is determined in the step S1603 that no data of the print job of the logged-in user has been stored, the present process is immediately terminated. On the other hand, if it is determined that data of a print job of the logged-in user has been stored, the print job controller 503 passes the data of the print job of the logged-in user stored in the reservation printing emergency area 1902 to the printing section 307, and causes the printing section 307 to perform printing based on the data of the print job (step S1604). When printing is completed, the print job controller 503 deletes the data of the print job stored in the reservation printing emergency area 1902, and releases reservation of the reservation printing emergency area 1902 (step S1605). Specifically, the print job controller 503 deletes an emergency area-reserving user management information table 1700 shown in FIG. 16B. Then, the present process is terminated.

Note that the emergency area-reserving user management information table 1700 is generated in a step S1404 in FIG. 12, referred to hereinafter, and the print job controller 503 can refer to the emergency area-reserving user management information table 1700 at a desired time.

Note that the present embodiment can be applied to a system in which the printer driver 402 can specify a storage time period on a print job-by-print job basis. The print job controller 503 may be configured to store data of a print job in the reservation printing emergency area 1902 in a case where the storage time period of each job, set in the received print job, is not longer than the emergency area usable time period, and also the free space of the reservation printing area 1901 is insufficient. This emergency area usable time period is a time period input as the emergency area usable time period 905 on the reservation printing setting screen 900 shown in FIG. 8.

As described above, when a user logs in the MFP 102, if data of a print job of the logged-in user has been stored in the reservation printing emergency area 1902, printing is immediately executed, and the reservation of the reservation printing emergency area 1902 is released, whereby other users are enabled to use the reservation printing emergency area 1902.

Next, the process for free space checking and print job reservation processing performed by the MFP 102 in the steps S1107 and S1108 in FIG. 6 will be described.

Figure 10:
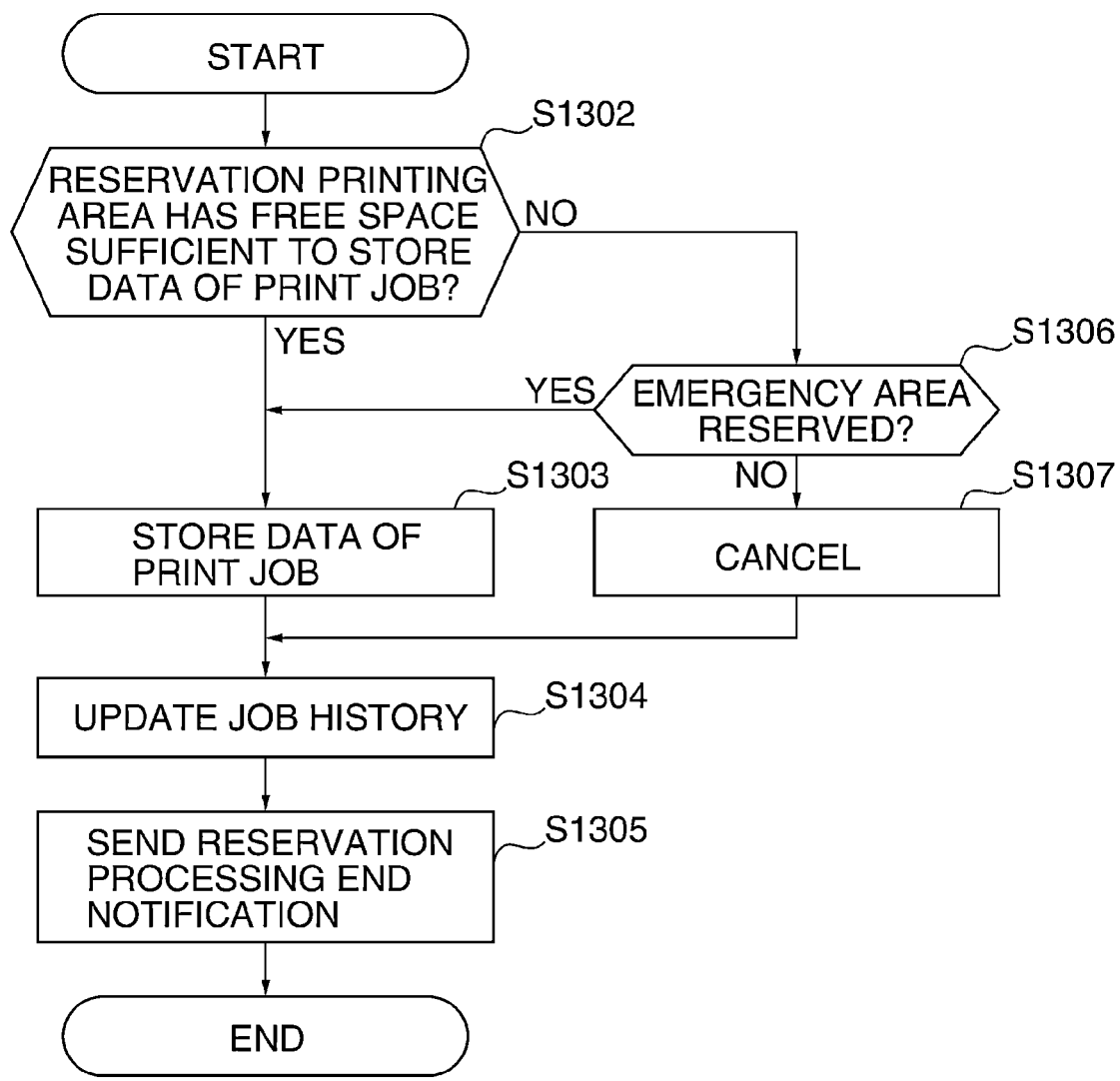
FIG. 10 is a flowchart of a process for free space checking and print job reservation processing, which is performed in steps S1107 and S1108 in FIG. 6.

FIG. 10 is a flowchart of the process for free space checking and print job reservation processing, which is performed in the steps S1107 and S1108 in FIG. 6.

Upon receipt of a print job from the PC 101, the print job controller 503 determines whether or not there is a free space in the reservation printing area 1901 sufficient to store data of the print job (step S1302). If it is determined that there is not a free space sufficient to store the data of the print job, the print job controller 503 proceeds to a step S1306. On the other hand, if it is determined that there is a free space sufficient to store the data of the print job, the print job controller 503 proceeds to a step S1303.

In the step S1303, the print job controller 503 executes the print job reservation processing to thereby cause the print job memory section 502 to store the data of the received print job in the reservation printing area 1901.

Next, the print job controller 503 updates the job history (step S1304), and transmits the reservation processing end notification to the PC 101 (step S1305), followed by terminating the present process. Note that detailed description of update of the job history in the step S1304 and transmission of the reservation processing end notification in the step S1305 is omitted.

In the step S1306, the print job controller 503 determines whether or not the reservation printing emergency area 1902 has been reserved by the user, and if it is determined that the reservation printing emergency area 1902 has been reserved by the user, the print job controller 503 proceeds to the step S1303. On the other hand, if it is determined that the reservation printing emergency area 1902 has not been reserved by the user, the print job controller 503 cancels the print job reservation processing (step S1307), and the print job controller 503 proceeds to the step S1304. Determination performed by the print job controller 503 as to whether or not the reservation printing emergency area 1902 has been reserved by the user is performed according to whether or not a value is set to an emergency area-reserving user 1701 of the emergency area-reserving user management information table 1700 shown in FIG. 16B. For example, in a case where a vale of "kaneko" is stored in the emergency area-reserving user 1701, it is determined that a user having the user name of "kaneko" has reserved the reservation printing emergency area 1902. Further, the emergency area-reserving user management information table 1700 stores not only the emergency area-reserving user 1701, but also a reservation expiration time 1702.

Next, a process for reservation processing end notification and display, and emergency area reservation, which is performed by the PC 101 in the steps S1109 to S1112 in FIG. 6, will be described.

Figure 11:
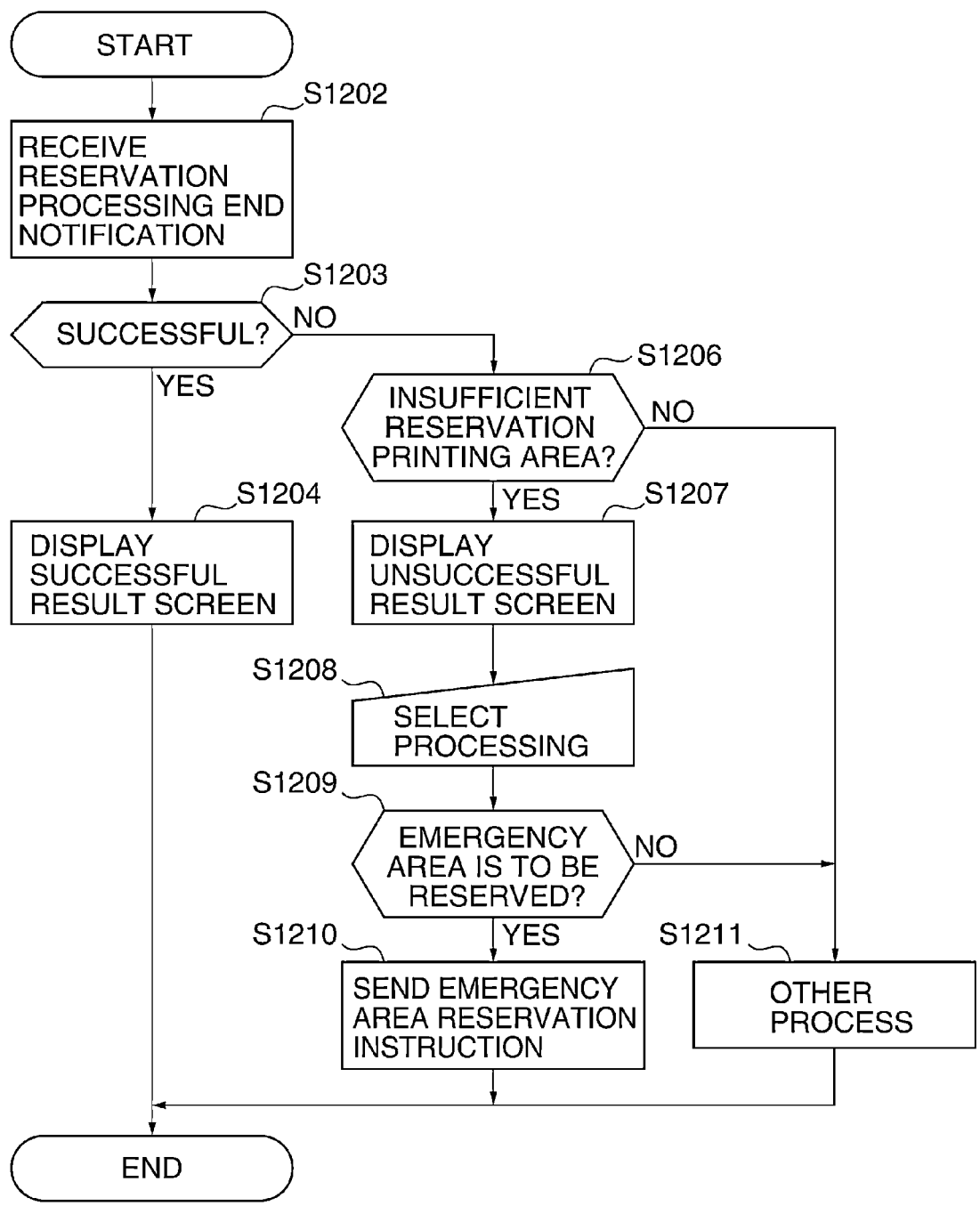
FIG. 11 is a flowchart of a process for reservation processing end notification and display, and emergency area reservation, which is performed in steps S1109 to S1112 in FIG. 6.

FIG. 11 is a flowchart of the process for reservation processing end notification and display, and emergency area reservation, which is performed in the steps S1109 to S1112 in FIG. 6.

When the PC 101 receives the reservation processing end notification from the MFP 102 (step S1202), the print job-monitoring section 404 determines whether or not the print job reservation processing has been successfully executed (step S1203). If it is determined that the print job reservation processing has been successfully executed, i.e. the data of the print job has been stored in the reservation printing area 1901 of the auxiliary memory 303, the print job-monitoring section 404 displays the job reservation processing result screen 600 shown in FIG. 7A on the display unit 204 (step S1204), followed by terminating the present process. On the other hand, if it is determined in the step S1203 that the print job reservation processing has not been successfully executed, i.e. the data of the print job has not been stored in the reservation printing area 1901 of the auxiliary memory 303, the print job-monitoring section 404 proceeds to a step S1206.

In the step S1206, the print job-monitoring section 404 determines whether or not the reason for unsuccessful execution of the print job reservation processing is due to an insufficient free space of the reservation printing area 1901. If it is determined that the reason is not due to an insufficient free space of the reservation printing area 1901, the print job-monitoring section 404 executes the other process (step S1211), followed by terminating the present process. On the other hand, if it is determined that the reason is due to an insufficient free space of the reservation printing area 1901, the print job-monitoring section 404 proceeds to a step S1207.

In the step S1207, the print job-monitoring section 404 displays the job reservation processing result screen 700 shown in FIG. 7B on the display unit 204. After that, the print job-monitoring section 404 receives a processing selection operation by the user on the job reservation processing result screen 700 (step S1208), and if pressing of the emergency area reservation button 701 is detected (YES to a step S1209), the print job-monitoring section 404 proceeds to a step S1210. On the other hand, if the job reservation processing result screen 700 is closed without pressing of the emergency area reservation button 701 being detected (NO to the step S1209), the print job-monitoring section 404 proceeds to the step S1211. Note that detailed description of the other process in the step S1211 is omitted.

In the step S1210, the print job-monitoring section 404 sends an emergency area reservation instruction to the MFP 102, followed by terminating the present process.

Next, the emergency area reservation process in the step S1113 in FIG. 6, which is performed by the MFP 102, will be described.

Figure 12:
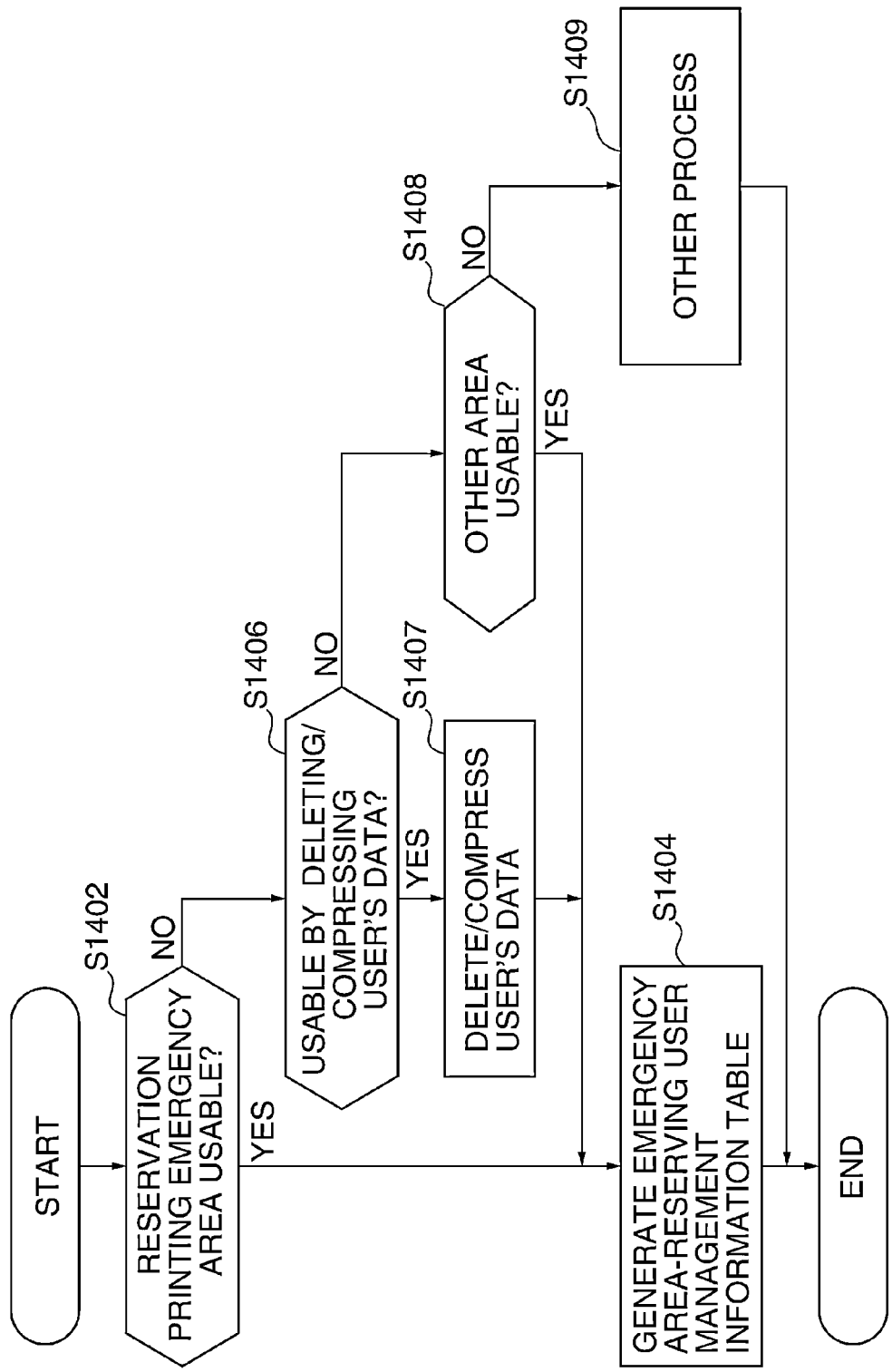
FIG. 12 is a flowchart of an emergency area reservation process performed by the MFP in a step S1113 in FIG. 6.

FIG. 12 is a flowchart of the emergency area reservation process performed by the MFP 102 in the step S1113 in FIG. 6.

First, upon receipt of the reservation instruction from the PC 101, the reservation management section 505 determines whether or not the reservation printing emergency area 1902 can be used (step S1402). The reservation printing emergency area 1902 is an area the space of which is set in the emergency area 902 of the reservation printing setting screen 900 described hereinabove. If it is determined that the reservation printing emergency area 1902 cannot be used, the process proceeds to a step S1406, whereas if it is determined that the reservation printing emergency area 1902 can be used, the reservation management section 505 proceeds to the step S1404. Examples of the case where the reservation printing emergency area 1902 cannot be used include a case where a value input to the emergency area 902 on the reservation printing setting screen 900 is 0.

In the step S1404, the reservation management section 505 generates the emergency area-reserving user management information table 1700, and stores the data of the print job in the reservation printing emergency area 1902 of the auxiliary memory 303, followed by terminating the present process. The emergency area-reserving user management information table 1700 is stored in the other area 1903 of the auxiliary memory 303. The value of the emergency area-reserving user 1701 of the emergency area-reserving user management information table 1700 is set to a user name of the user having logged in the MFP 102. The value of the reservation expiration time 1702 of the emergency area-reserving user management information table 1700 is set to a time obtained by adding a time period input in the emergency area usable time period 905 to a time at which the reservation is made.

On the other hand, in the step S1406, the print job controller 503 determines whether or not a sufficient free space can be secured by deleting or compressing document data stored in the auxiliary memory 303. Here, the owner of the document data to be deleted or compressed is assumed to be the logged-in user who has input the print job. Further, the document data may be data of another print job input by the logged-in user.

If it is determined in the step S1406 that the sufficient free space can be secured, the print job controller 503 deletes or compresses the document data whose owner is the logged-in user (step S1407), and then proceeds to the step S1404. On the other hand, if it is determined in the step S1406 that the sufficient free space cannot be secured, the print job controller 503 determines whether or not there is a usable area other than the reservation printing area 1901 (step S1408). If it is determined that there is a usable area other than the area for storing data of a print job, the process proceeds to the step S1404, whereas if not, the other process (step S1409) is executed, followed by terminating the present process. Note that detailed description of the other process in the step S1409 is omitted.

In the present embodiment, it is possible to reserve the reservation printing emergency area 1902 of the auxiliary memory 303 for a specified user such that it can be used for a specified time period, but if the reservation printing emergency area 1902 is reserved for a long time, this affects reservation of the same by other users. To eliminate this inconvenience, with a view to preventing data of a print job of a specified user from being stored in the reservation printing emergency area 1902 for a long time, the reservation management section 505 periodically (e.g. whenever 10 seconds elapses) monitors the reservation state to perform an emergency area management process in FIG. 13.

Figure 13:
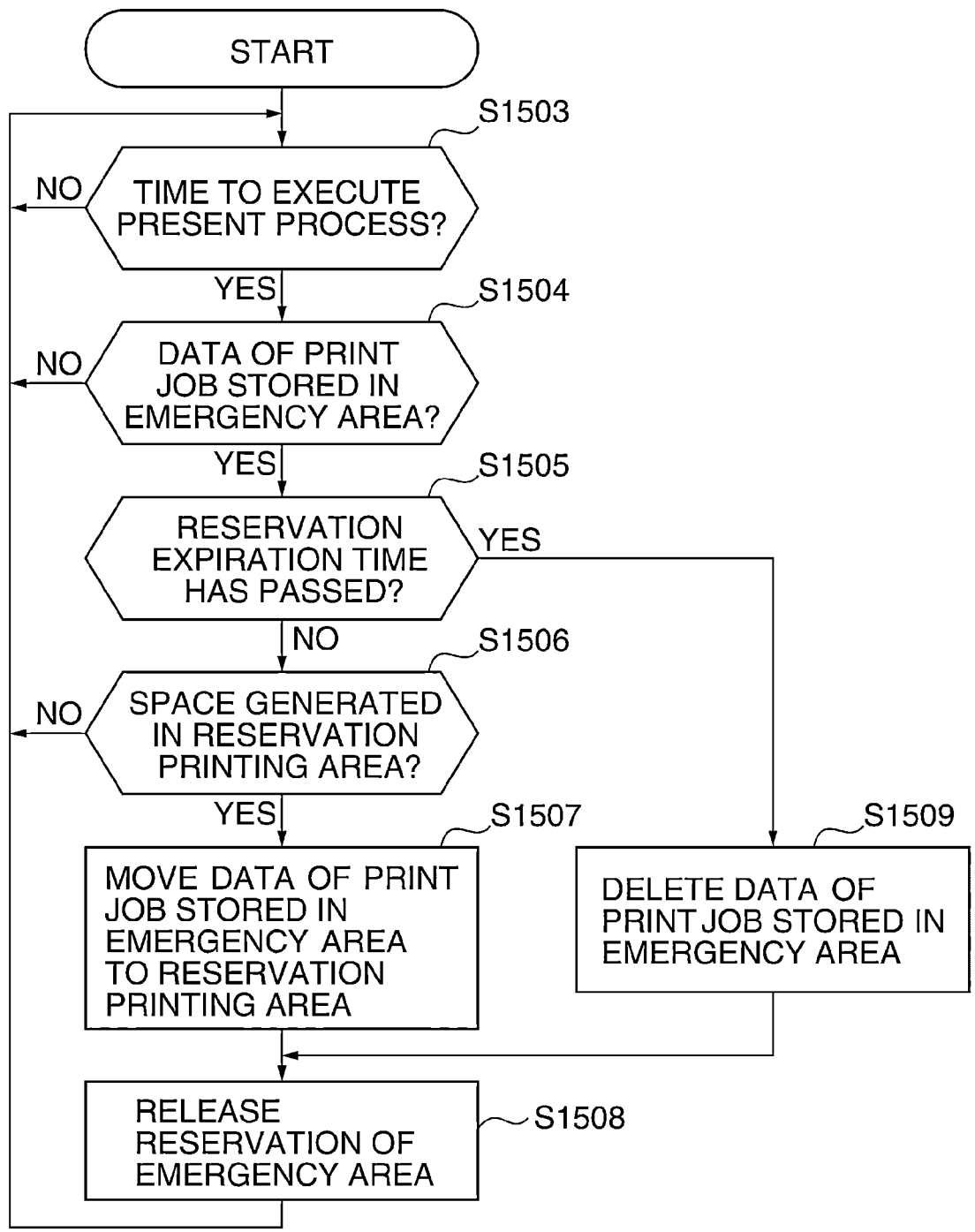
FIG. 13 is a flowchart of an emergency area management process performed by a reservation management section of the MFP.

FIG. 13 is a flowchart of the emergency area management process performed by the reservation management section 505 of the MFP 102.

The reservation management section 505 determines whether or not it is time to execute the present process (step S1503), and if it is time to execute the present process, the reservation management section 505 determines whether or not data of a print job has been stored in the reservation printing emergency area 1902 (step S1504). If it is determined that no data of a print job has been stored, the reservation management section 505 returns to the step S1503. On the other hand, if it is determined that data of a print job has been stored in the reservation printing emergency area 1902, the reservation management section 505 proceeds to a step S1505.

In the step S1505, the reservation management section 505 refers to the value of the reservation expiration time 1702 of the emergency area-reserving user management information table 1700, and determines whether or not the time set to the reservation expiration time 1702 has passed. If it is determined that the time set to the reservation expiration time 1702 has passed, the reservation management section 505 deletes the data of the print job stored in the reservation printing emergency area 1902 (step S1509), and then proceeds to a step S1508. On the other hand, if it is determined in the step S1505 that the time set to the reservation expiration time 1702 has not passed, the reservation management section 505 determines whether or not there has been generated, in the reservation printing area 1901, a free space sufficient to store data of a print job stored in the reservation printing emergency area 1902 (step S1506).

If it is determined in the step S1506 that there has not been generated, in the reservation printing area 1901, a free space sufficient to store data of a print job stored in the reservation printing emergency area 1902, the process returns to the step S1503. On the other hand, if it is determined in the step S1506 that there has been generated, in the reservation printing area 1901, a free space sufficient to store data of a print job stored in the reservation printing emergency area 1902, the reservation management section 505 moves the data of the print job stored in the reservation printing emergency area 1902 to the reservation printing area 1901 (step S1507).

In the step S1508, the reservation management section 505 releases the reservation of the reservation printing emergency area 1902, and then returns to the step S1503. More specifically, the reservation management section 505 deletes the stored emergency area-reserving user management information table 1700.

Next, a description will be given of a job history-displaying process which is executed by the MFP 102 and includes enabling/disabling of an emergency area reservation button displayed on a job history screen 800 shown in FIG. 15.

Figure 14:
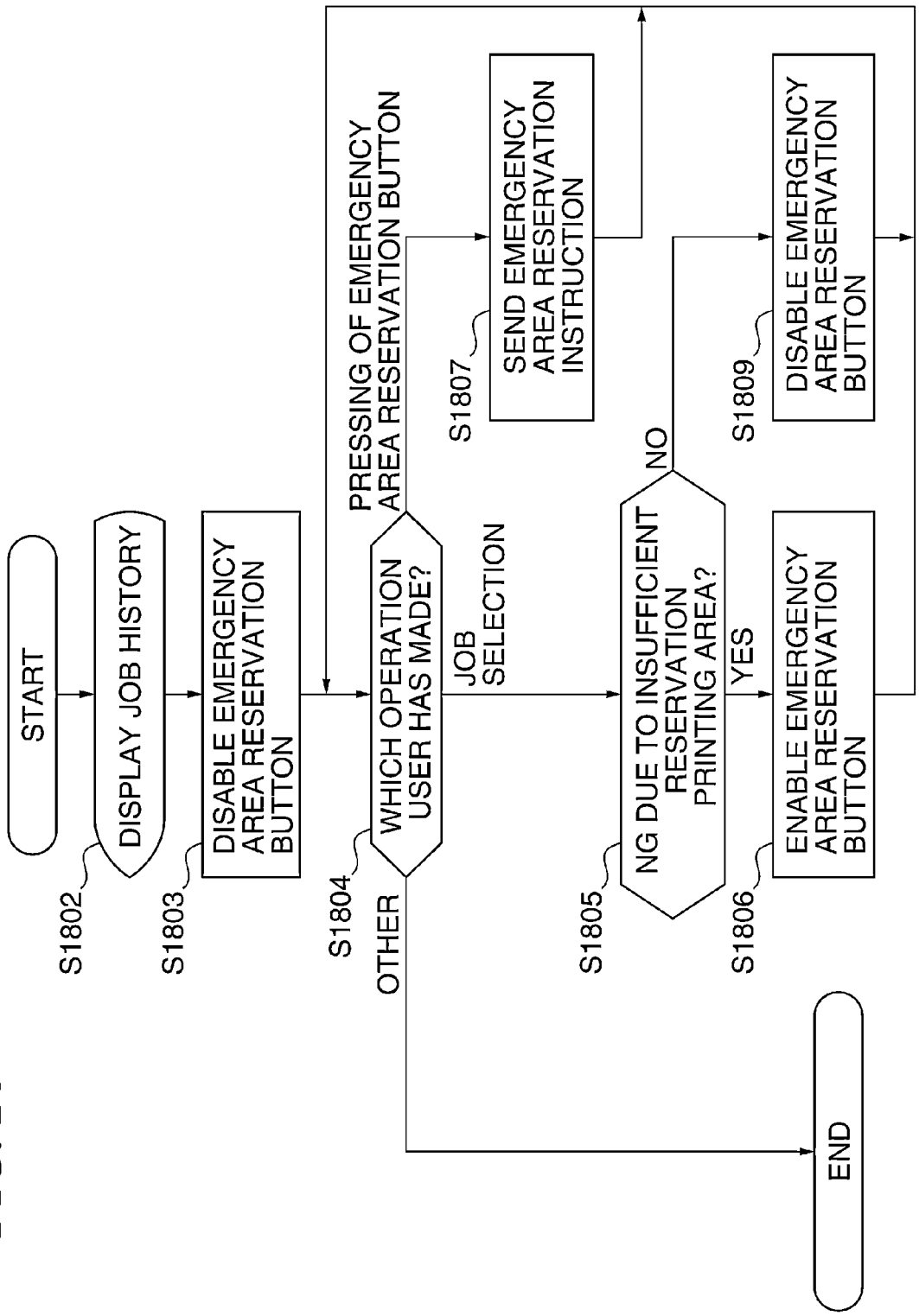
FIG. 14 is a flowchart of a job history-displaying process performed by a job history display unit of the MFP.

FIG. 14 is a flowchart of the job history-displaying process performed by the job history-displaying section 504 of the MFP 102. FIG. 15 is a diagram showing an example of the job history screen displayed on the display unit 304 of the MFP 102.

Referring to FIG. 15, the job history screen 800 includes a job name-displaying area 801, a user name-displaying area 802, a processing result-displaying area 803, and the emergency area reservation button, denoted by reference numeral 804.

Buttons 806 and 807 are used for changing the display when all of the job history is not accommodated in the display area of the screen. In the processing result-displaying area 803, the processing result of "NG: insufficient free space" 805 is displayed for a print job which could not be reserved due to an insufficient free space of the reservation printing area 1901 in the steps S1107 and S1108 in FIG. 6.

The emergency area reservation button 804 can be pressed only when a job is selected for which the processing result of "NG: insufficient free space" is displayed in the processing result-displaying area 803.

Although the job history screen 800 is suitably displayed at timing immediately after the user has logged in the MFP 102 in the step S1602 in FIG. 9, the configuration may be such that the job history screen 800 is displayed according to an instruction by the logged-in user.

Referring to FIG. 14, in a step S1802, the job history-displaying section 504 displays the job history screen 800 shown in FIG. 15 on the display unit 304. At this time, the emergency area reservation button 804 on the job history screen 800 is in a disabled or grayed-out state (step S1803).

Next, when a user's operation is received in a step S1804, the job history-displaying section 504 identifies the type of the user's operation. When the user's operation is a job selection operation, the job history-displaying section 504 determines whether or not the processing result of the selected job is NG due to an insufficient free space of the reservation printing area 1901 (step S1805). This can be determined by referring to the processing result-displaying area 803 on the job history screen 800.

If it is determined in the step S1805 that processing result of the selected job is NG due to an insufficient free space of the reservation printing area 1901, the job history-displaying section 504 enables the emergency area reservation button 804 on the job history screen 800 (step S1806), and returns to the step S1804. That is, the emergency area reservation button 804 is enabled whereby reception of reservation is enabled.

On the other hand, if it is determined in the step S1805 that processing result of the selected job is NG not due to an insufficient free space of the reservation printing area 1901, the job history-displaying section 504 disables the emergency area reservation button 804 (step S1809), and returns to the step S1804. That is, the emergency area reservation button 804 remains disabled to thereby continue to disable reception of reservation.

If it is determined in the step S1804 that the user's operation is a pressing operation of the emergency area reservation button 804, the print job controller 503 sends an emergency area reservation instruction to the reservation management section 505 (step S1807), and then returns to the step S1804. If it is determined in the step S1804 that an operation other than the above-described ones has been performed by the user, the present process is terminated.

According to the above-described process, the user can easily find a print job the data of which could not be stored by the print job reservation processing due to an insufficient free space of the memory area by viewing the job history screen 800. Further, the user is enabled to reserve the reservation printing emergency area 1902 at the same time, and hence it is possible to secure a memory area such that it is not used by other users, whereby it is made possible to execute the reservation printing of the print job the data of which could not be stored by the print job reservation processing due to an insufficient free space of the memory area.

According to the present embodiment, the reservation printing area 1901 and the reservation printing emergency area 1902 for storing data of a print job are provided in the auxiliary memory 303, and reservation for storing data of a print job of a logged-in user in the reservation printing emergency area 1902 is received. Then, when the data of the print job of the logged-in user for which reservation has been received cannot be stored in the reservation printing area 1901, the data of the print job is caused to be stored in the reservation printing emergency area 1902. This makes it possible, even when the MFP enters a state in which data of a print job cannot be stored in the auxiliary memory 303 due to an insufficient free space of the memory area, it is possible to perform reservation printing by securing a memory area which is not used by other users.

Although it is necessary to perform reservation to use the reservation printing emergency area 1902, reservation can be performed from both of the PC 101 and the MFP 102. Further, when the reservation printing emergency area 1902 has not been used for a specified time period, the reservation is immediately released, whereby it is possible to permit other users to use the reservation printing emergency area 1902.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172255 filed Aug. 22, 2013, which is hereby incorporated by reference herein in its entirety.

What is claimed is:

1. An image forming apparatus configured to perform a print job according to print data received from an external device, the image forming apparatus comprising:
a memory unit having a first memory area and a second memory area;
a notification unit configured to notify the external device that data of a print job received from the external device cannot be stored in the first memory area due to an insufficient free space of the first memory area;
a reception unit configured to receive an instruction, from the external device, for storing the data of the print job, which cannot be stored in the first memory area, in the second memory area; and
a control unit configured to cause the data to be stored in the second memory area according to the received instruction.

2. The image forming apparatus according to claim 1, wherein in a case where a user of the print job logs in the image forming apparatus in a state in which the data has been stored in the second memory area, said control unit causes a print process to be executed based on the data, and then deletes the data.

3. The image forming apparatus according to claim 1, further comprising a designation unit configured to designate a usable time period over which the second memory area can be used, and
wherein when the usable time period designated by said designation unit elapses after storing the data in the second memory area, said control unit deletes the data.

4. The image forming apparatus according to claim 3, wherein in a case where a free space to store the data is generated in the first memory area before the usable time period, said control unit moves the data into the first memory area.

5. The image forming apparatus according to claim 3, further comprising a first determination unit configured to determine whether or not the second memory area can be used when the instruction is received by said reception unit; and
a second determination unit configured to determine whether or not a free space can be secured by deleting or compressing data which has been stored in said memory unit, and
wherein in a case where it is determined that the second memory area cannot be used, and that a free space can be secured by deleting or compressing the data which has been stored in said memory unit, said control unit causes data of a logged-in user to be deleted or compressed.

6. The image forming apparatus according to claim 5, wherein in a case where it is determined that the second memory area cannot be used, and that a free space cannot be secured even by deleting or compressing data which has been stored in said memory unit, said control unit performs control such that the data of the print job is stored in a usable area of said memory unit other than the first memory area.

7. The image forming apparatus according to claim 1, wherein in a case where a free space sufficient to store the data of the print job is generated in the first memory area, in a state in which the data of the print job of a logged-in user has been stored in the second memory area, said control unit moves the data of the print job to the first memory area.

8. The image forming apparatus according to claim 1, further comprising a history display unit configured to display history of print data items processed by the image forming apparatus, and wherein in a case where a print data item of a logged-in user which could not be stored in the first memory area is selected from the print data items history of which is being displayed by said history display unit, said reception unit enables reception of the instruction.

9. The image forming apparatus according to claim 1, further comprising a result display unit configured to display a processing result of data, and wherein said reception unit enables reception of the instruction in a case where the data could not be stored in the first memory area.

10. A method of controlling an image forming apparatus configured to perform a print job according to print data received from an external device, the method comprising:

storing data of a print job in a memory unit having a first memory area and a second memory area;

notifying the external device that data of a print job received from the external device cannot be stored in the first memory area due to an insufficient free space of the first memory area;

receiving an instruction, from the external device, for storing the data of the print job, which cannot be stored in the first memory area, in the second memory area; and causing the data to be stored in the second memory area according to the received instruction.

11. A non-transitory computer-readable storage medium storing a computer-executable program for executing a method of controlling an image forming apparatus configured to perform a print job according to print data received from an external device, wherein the method comprises:

storing data of a print job in a memory unit having a first memory area and a second memory area;

notifying the external device that data of a print job received from the external device cannot be stored in the first memory area due to an insufficient free space of the first memory area;

receiving an instruction, from the external device, for storing the data of the print job, which cannot be stored in the first memory area, in the second memory area; and causing the data to be stored in the second memory area according to the received instruction.

* * * * *